United States Patent [19]

Burgess

[11] 4,074,571
[45] Feb. 21, 1978

[54] OBSTACLE ASSEMBLY FOR VORTEX TYPE FLOWMETER

[75] Inventor: Thomas H. Burgess, Horsham, Pa.

[73] Assignee: Fischer & Porter Co., Warminster, Pa.

[21] Appl. No.: 493,855

[22] Filed: Aug. 1, 1974

[51] Int. Cl.² .............................................. G01F 1/00
[52] U.S. Cl. .................................................. 73/194 B
[58] Field of Search ...................................... 73/194 B

[56] References Cited

U.S. PATENT DOCUMENTS

| | | | |
|---|---|---|---|
| 2,936,619 | 5/1960 | Gibney | 73/194 B |
| 3,175,398 | 3/1965 | Sundin | 73/194 B |
| 3,589,185 | 6/1971 | Burgess | 73/194 B |
| 3,677,067 | 7/1972 | Miller | 73/194 B |
| 3,698,245 | 10/1972 | McNabb | 73/194 B |
| 3,719,073 | 3/1973 | Mahon | 73/194 B |
| 3,867,839 | 2/1975 | Herzl | 73/194 B |

*Primary Examiner*—Harry N. Haroian

[57] ABSTRACT

A flowmeter including a conduit-forming a passage for the liquid to be measured and an obstacle assembly mounted therein capable of generating strong, stabilized fluidic oscillations which cause a deflectable non-streamlined section of the assembly to vibrate at a corresponding rate, the vibrations being sensed to produce a signal whose frequency is proportional to the flow rate of the fluid passing through the conduit. The non-streamlined section is cantilevered from a front section to define a gap therebetween and is provided with a downstream tail whose geometry is such as to reinforce the fluidic oscillations trapped within said gap to thereby improve the signal-to-noise ratio of the signal.

2 Claims, 9 Drawing Figures

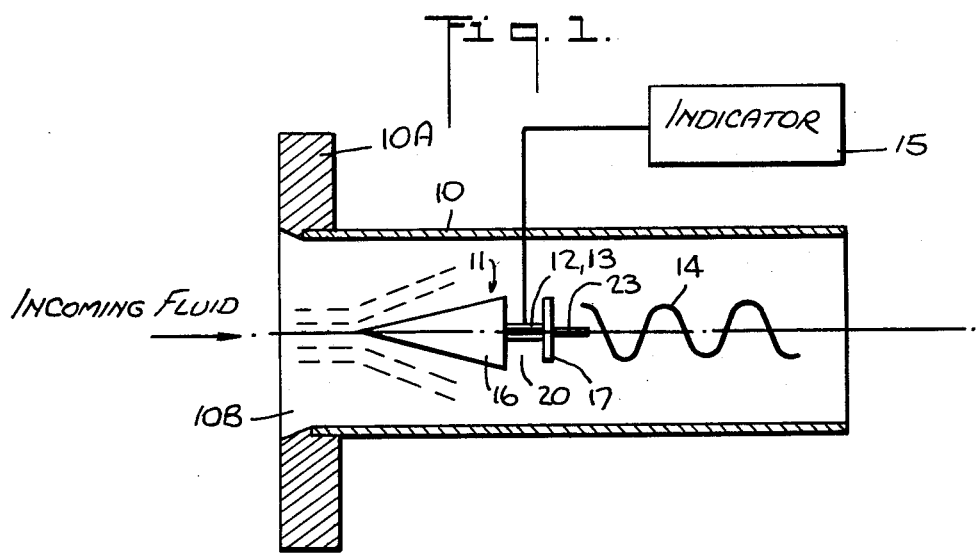
Fig. 1.
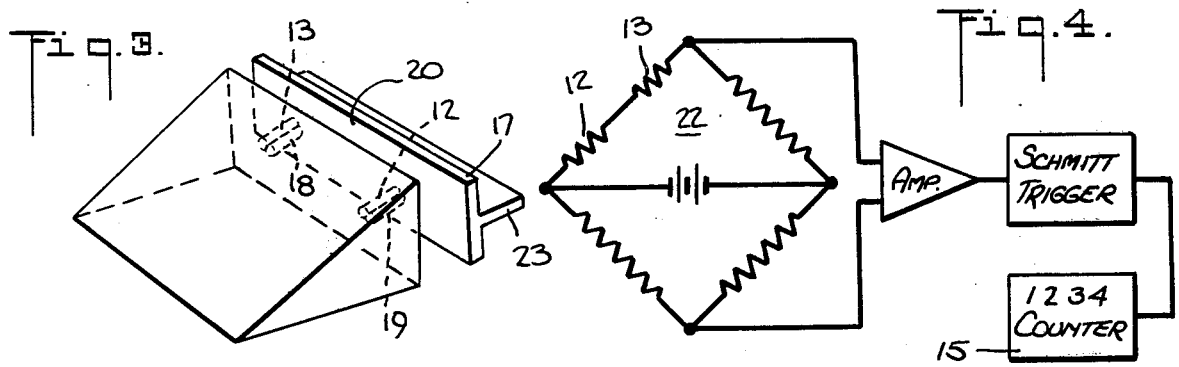
Fig. 3. Fig. 4.
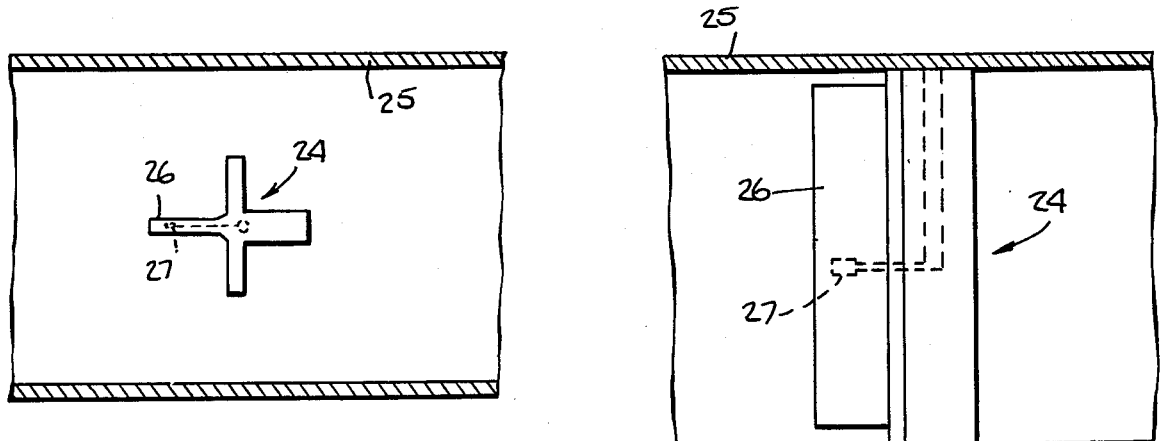
Fig. 6.
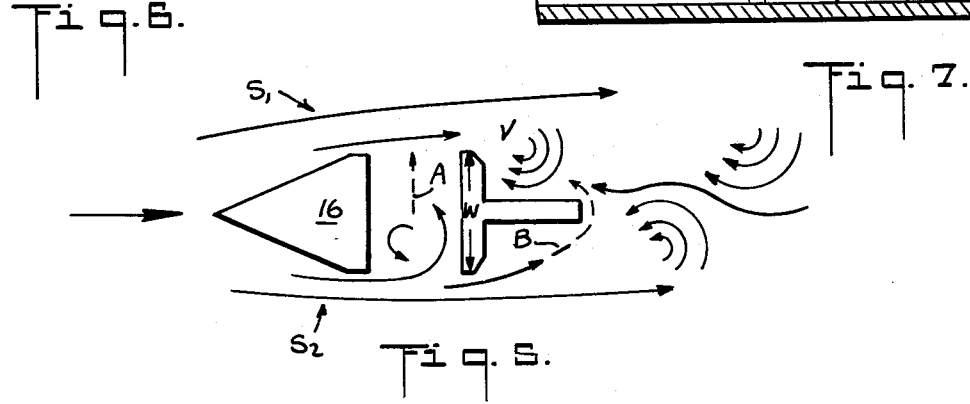
Fig. 7.
Fig. 5.

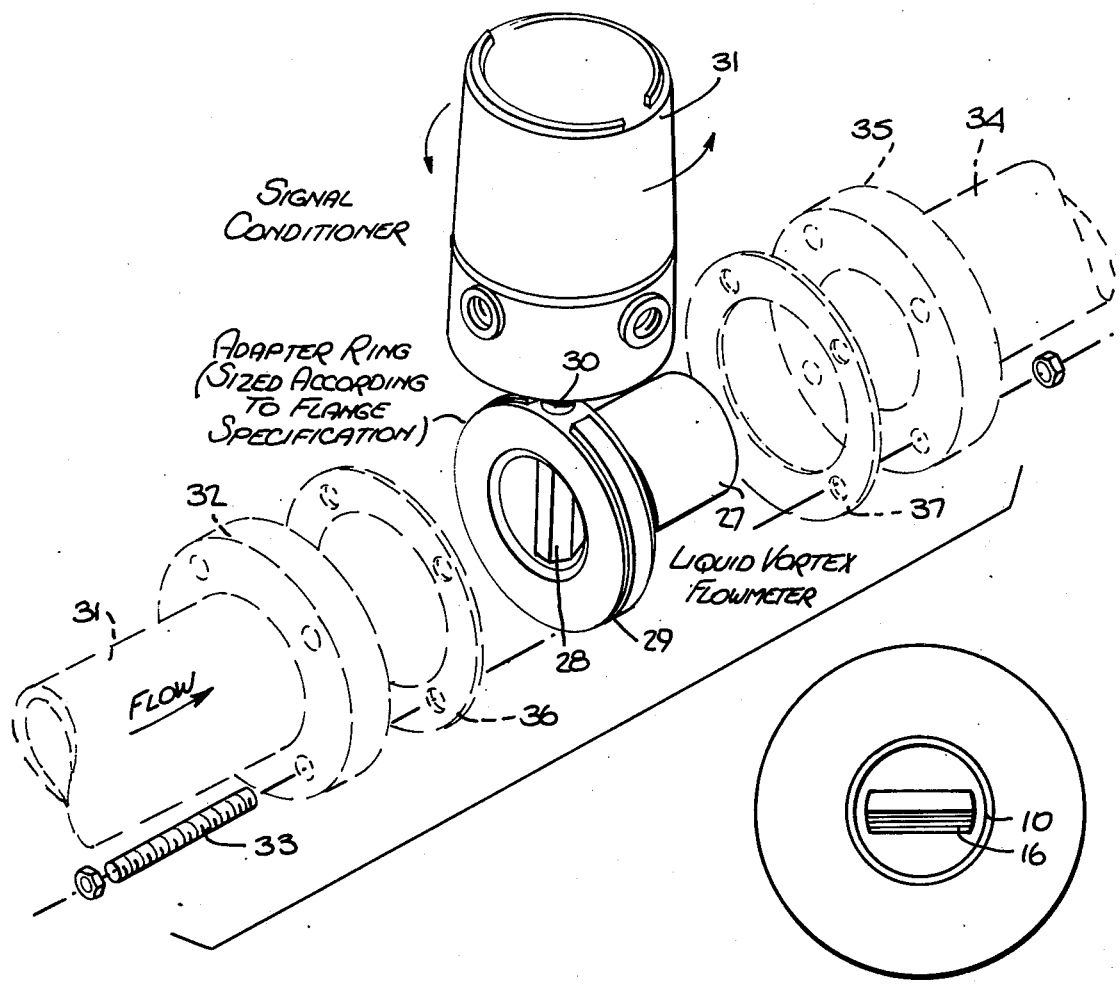
Fig. 8.
Fig. 2.
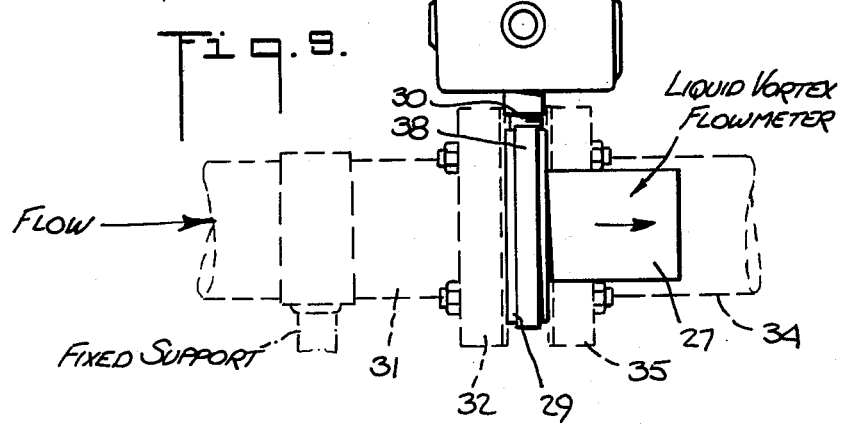
Fig. 9.

OBSTACLE ASSEMBLY FOR VORTEX TYPE FLOWMETER

BACKGROUND OF THE INVENTION

This invention relates generally to flowmeters for metering liquids or gases, and more particularly to flowmeters of the vortex-shedding type and to improved obstacle assemblies and sensors therefor.

It is well known that under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. It is this phenomenon which is exploited to create a flowmeter. Flowmeters of this type are disclosed in the Bird U.S. Pat. No. 3,116,639, and in the White U.S. Pat. No. 3,650,152.

My prior U.S. Pat. No. 3,589,185 discloses an improved form of vortex-type flowmeter wherein the signal derived from the fluid oscillation is relatively strong and stable to afford a favorable signal-to-noise ratio insuring accurate flow-rate information over a broad range. In this meter, an obstacle assembly is mounted in the flow conduit, the assembly being constituted by a block positioned across the conduit with its longitudinal axis at right angles to the direction of fluid flow, a strip being similarly mounted across the conduit behind the block and being spaced therefrom to define a gap which serves to trap Karman vortices and to strengthen and stabilize the vortex street. This street is sensed to produce a signal whose frequency is proportional to flow rate.

In my copending application Ser. No. 354,803 there is disclosed an obstacle assembly in a vortex meter, the assembly being constituted by a fixed front section contoured to cause flow separation of the incoming fluid stream whose flow rate is to be measured, and a rear non-streamlined section which is shaped to interfere with the vortex street in the wake of the front section and is cantilevered from the front section to define a gap. The rear section is slightly deflectable relative to the front section whereby it is excited into minute vibrations by the vortex street. These vibrations are sensed by a strain gauge to produce a signal proportional to flow rate.

Because of the interfering effect of the rear section on the vortex street, one obtains a stronger vortex than with an ordinary obstacle assembly. The strength of the vortex determines the signal-to-noise ratio of the meter in that unless the vortex is strong, the signal is difficult to distinguish from turbulent noise produced by random flow disturbance that accompanies the regular oscillatory motion giving rise to the desired signal. As pointed out in said copending application, the vibratory motion of the rear assembly may be enhanced by securing a tail to the rear section, the tail extending downstream from the rear section. The use of a downstream tail is also disclosed in the above-identified White patent (FIG. 5), the tail taking the form of a semi-circular vane which is intended to stabilize the oscillatory flow in the downstream wake.

I have found however that the effectiveness of the tail depends on the phase relationship between the fluidic pressure forces produced in the gap between the front and rear sections of the obstacle assembly and the vortex forces produced behind the rear section, and that this phase relationship, by proper design of the tail, may be adjusted to optimize the effect of the tail.

SUMMARY OF THE INVENTION

In view of the foregoing, the main object of this invention is to provide a practical, low cost flowmeter of the vortex type wherein the obstacle assembly mounted within the flow conduit is capable of generating strong, stabilized fluidic oscillations which cause a deflectable section of the assembly to vibrate at a corresponding rate, the vibrations being sensed to produce a signal whose frequency is proportional to the flow rate of the fluid passing through the conduit.

More specifically, it is an object of this invention to provide a flowmeter of the above-identified type wherein the obstacle assembly is constituted by a front section fixedly mounted within the conduit and a rear section resiliently cantilevered onto the front section to define a gap therebetween whereby the rear section is slightly deflectable and is excited into vibration by fluidic oscillations generated in the flow conduit, the rear section having a tail extending downstream thereof, the geometry of the tail being such as to reinforce fluidic oscillations trapped within the gap.

Also an object of the invention is to provide a vortex-type flowmeter in which the vibrations of the deflectable rear section are sensed by one or more strain gauges or piezoelectric detectors to produce periodic changes in electrical values resulting in a signal whose frequency is proportional to the vibratory rate of the rear section and hence to the flow rate of the fluid.

Briefly stated, these objects are attained in a flowmeter including a flow conduit forming a passage for the fluid to be metered and an obstacle assembly mounted therein which incorporates a vibration sensor. The assembly is constituted by a front body section having a contoured cross section which is preferably uniform throughout the longitudinal axis thereof, the front section being fixedly positioned across the conduit with its longitudinal axis at right angles to the flow axis of the conduit.

Similarly positioned across the conduit behind the front section is a rear section which is spaced from the front section and secured thereto by means of a resilient support to define a gap which serves to trap Karman vortices, the rear section having a non-streamlined shape which interferes with and acts to strengthen and stabilize the vortex street. Because the rear section is slightly deflectable it is excited into vibration by the vortices at a rate whose frequency is proportional to the flow rate of the fluid. Extending downstream from the rear section is a tail whose geometry is such as to positively reinforce the fluidic oscillations trapped within the gap. The vibrating motion of the rear section is sensed by a strain gauge or a piezoelectric detector which is preferably disposed within the cantilever structure to produce a signal indicative of the flow rate.

OUTLINE OF THE DRAWING

For a better understanding of the invention as well as other objects and further features thereof, reference is made to the following detailed description to be read in conjunction with the accompanying drawing, wherein:

FIG. 1 is a longitudinal section taken through a preferred first embodiment of a vortex-type flowmeter in accordance with the invention;

FIG. 2 is a front end view of the meter shown in FIG. 1;

FIG. 3 is a perspective view of the obstacle assembly incorporated in the meter;

FIG. 4 shows the electrical circuit of the strain gauge sensor associated with the meter;

FIG. 5 schematically illustrates the principles underlying the invention;

FIG. 6 schematically illustrates in a longitudinal section a second embodiment of a flowmeter in accordance with the invention;

FIG. 7 is a transverse section of the second embodiment;

FIG. 8 is an exploded view of a third embodiment of a flowmeter insert in accordance with the invention; and FIG. 9 is an elevational view of the insert.

DESCRIPTION OF THE INVENTION

FIRST EMBODIMENT

Referring now to the drawing and more particularly to FIGS. 1 to 3, a flowmeter of the vortex type according to the invention comprises a flow conduit 10, an obstacle assembly generally designated by numberal 11, mounted within the assembly, and a sensor constituted by strain gauges 12 and 13 supported in the assembly. To facilitate insertion of the flowmeter within a pipe, the conduit is provided with a mounting flange 10A whereby the conduit may be inserted within a flow line and the flange thereof clamped between the flanges of upstream and downstream pipes.

Conduit 10, which is shown as having a circular cross-section but which may be in other cross-sectional forms, includes an inlet 10A into which a fluid to be metered is introduced. The flow impinges on obstacle assembly 11 which acts to divide the flow around the obstacle, the assembly producing fluidic perturbations in the form of a Karman vortex street. The nature of this phenomenon is explained in the text by Schlichtling, "Boundary Layer Theory" (McGraw-Hill - 1960).

The resultant fluidic oscillations in the downstream wake, roughly represented by trace line 14, are sensed by strain gauges 12 and 13 to produce an electrical signal which is applied to a suitable indicator or recorder 15 to provide flow rate readings.

Obstacle assembly 11 is formed by a front section 16 and a rear section 17 mounted behind the front section by a cantilever support constituted by a pair of resilient pins 18 and 19. Front section 16 is a contoured block having a triangular or delta shaped cross-section which is uniform throughout the longitudinal axis of the block, this axis being perpendicular to the flow axis of the conduit. The ends of the front section are secured to the wall of the conduit whereby the front section is fixedly held within the conduit.

The apex of the block faces the incoming fluid, the inclined sides thereof forming leading edges which are swept by the flow of fluid to create vortices. The invention is not limited to obstacle bodies of this shape, for this may take other shapes such as those disclosed in my prior U.S. Pat. No. 3,589,185.

The rear section 17 takes the form of a non-streamlined body which in this embodiment is in strip form and is maintained by the pins 18 and 19 in spaced relation to the front section, the plane of the strip being parallel to the flat base of the block. The rear section shape is such as to interfere with the vortex street and the cavity or gap 20 created between the front section block and the rear section tends to trap the vortices and to strengthen and stabilize the vortex street produced thereby. While a strip is shown in the wake of the front section shedding block, it is to be understood that the invention encompasses any rear section whose shape and diameter are such as to interfere with the vortex street, as distinguished from a vane or other streamlined body which though acted upon by the street does not interfere therewith.

Because rear section 17 is cantilevered by means of resilient pins, it is deflectable. The pins, though functioning as tines, have sufficient rigidity so as to permit only a slight deflection of the rear section. As a consequence of the fluidic oscillations produced within the conduit, the rear section is excited into vibration at a rate corresponding to the frequency of the oscillations. The natural resonance of the deflectable rear section is such as to be well outside the normal frequency range of the meter whereby mechanical resonance peaks are absent and the amplitude of the vibrating motion accurately reflects the amplitude of the fluidic oscillations.

Because the deflectable system is relatively rigid, the total excursion of the rear section is minute even at the highest amplitudes of fluidic oscillation, so that metal fatigue of the supporting pins, as a result of the vibrating action, is minimized and failures do not arise after prolonged operation.

It is important to note that the magnitude of deflection is not of primary importance, for the flow rate information is given by the frequency, not the amplitude of vibration. Hence while the deflection magnitude is made extremely small in order to provide an acceptable fatigue life, this does not militate against a readable output of varying frequency.

From the basic Strouhal Number relationship for vortex shedding bodies, the oscillation frequency is approximately equal to 0.22 (V/D) where V is the velocity past the body and D is the body width.

The strain gauges extend between the front and rear sections along the support pins and are periodically stressed as the deflectable rear section undergoes vibration to produce corresponding changes in resistance. By connecting the two strain gauges in series in a bridge circuit 22 as shown in FIG. 4, the periodic change in resistance is converted into an electrical signal whose frequency is proportional to flow rate. Such gauges make use of a wire or grid whose electrical resistance is caused to change as a function of the strain imposed thereon, for when a wire is stretched, its length and diameter are altered with a resultant change in its ohmic value.

Alternatively, one may make use of semi-conductor, solid state strain gauges. In practice one may use a single gauge to provide a signal representing flow rate. A preferred form of sensor is a piezoelectric crystal or electrostrictive detector which is disposed in or on the pins in a manner whereby the crystal is periodically stressed to produce an output signal whose frequency is proportional to flow rate.

The pins for supporting the rear sections may be made of hollow tubing to receive the sensors, thereby concealing and protecting them from contaminants in the fluid. The leads from these sensors are preferably extended through the front section body and from there to the exterior of the conduit.

While the vibrating motions of the rear section is disclosed as being sensed by strain gauges, it will be appreciated that other forms of detectors, such as electromagnetic motion-sensing transducers, may be used for the same purpose. The vibrating motion is enhanced, as shown in FIG. 1, by securing a tail 23 to the rear section 17, the tail extending downstream. In practice, the front and rear sections could be rigidly interconnected and the tail be made deflectable relative thereto. The downstream section of the assembly carries out two functions, for this section which interferes with the wake not only stabilizes it to enhance its detectability, but its vibratory motion gives rise to the output signal.

Referring now to FIG. 5 which serves to explain the principles underlying the invention, it will be seen that the delta-shaped front section 16 of the obstacle assembly is disposed at right angles to the direction of flow of the incoming main fluid stream and acts to divide the streams into an upper stream $S_1$ and a lower stream $S_2$. As is well known, when an obstacle in the path of a fluid stream has a non-streamlined formation giving rise to a high order of boundary layer friction, then above a certain fluid velocity, inwardly swirling vortices are created in the downstream side of the obstacle at regular intervals. These vortices are produced first behind the rear edge of the front section and then behind the opposite edge thereof.

The alternately-developed vortices detach themselves from the front section and are carried downstream to produce vortex streets. The frequency at which the vortices is formed is proportional to the relative velocity of the fluid and is substantially independent of other parameters, provided that the Reynolds number for the obstacle lies between certain limits.

Gap 20 defined between front section 16 and the rear section 17, acts to trap the vortices and to strengthen and stabilize the vortex street produced thereby. As noted previously, tail 23 extending behind rear section 17 is intended to enhance this effect. But I have discovered that the effect of the tail on the vortices depends in good part on its geometric relationship to rear section 17. The tail is the leg of a T-shaped body whose base is constituted by the rear section, and I have found that the geometry of the "T" strongly influences the strength and stability of the vortex street and can be optimized by proper design.

In the obstacle assembly, the dynamic vortices created thereby are such as to produce fluidic pressure surges which flow across gap 20 in a more or less transverse path with respect to the longitudinal axis of the flow tube, as indicated by arrow A. Cantilever pins which support rear section 17 and are disposed in the gap do not materially interfere with the pressure surges therein. Concurrently generated are fluidic pressure surges which flow in an arcuate path around tail 23, as indicated by arrow B, which is to say around the leg of the T.

If we now consider a Vortex Street formed behind rear section 17, it will be seen that the pressure surges moving from one side of the rear body to the other across paths A and B influence the strength and stability of the vortex V. If these pressure surges are in phase with each other then they act as positive feedback pulses to reinforce vortex V, but if the surges are out of phase, their effect is negative and the Vortex Street pattern is less stable.

The length L of leg 23 of the T which extends along the longitudinal axis of the meter, relative to the width W of rear section 17 which extends at right angles to this axis, controls the feedback path B, so that by proper design of the T-shaped body, one can create a positive feedback path to reinforce the generation of vortices.

One can optimize the effect of the T by providing a body whose leg length L is substantially equal to the base width W, in which event the pressure surges along path B are in phase with the vortex-producing forces and the resultant vortices are strong and highly stable to provide a markedly improved signal-to-noise ratio.

SECOND EMBODIMENT

Referring now to FIGS. 6 and 7 there is shown a nonstreamlined obstacle assembly 24 disposed within a flow conduit 25, the assembly having a generally T-shaped cross section. The assembly is provided at its upstream side with a thin plate extension 26 which is slightly deflectable. Mounted on or within extension 26 is a deflection-type sensor 27 which may be a strain gauge adapted to detect small displacements of the plate relative to the vortex shedding body 24. In practice, the leads for the sensor could be brought out through the shedding body.

The alternate shedding of vortices downstream from the assembly 24, in the manner previously described, brings about an acceleration and subsequent deceleration of the flow on either side of the body. This gives rise to an alternating fluid velocity component at right angles to the main flow direction at the upstream side of the assembly.

This velocity component, which is oscillatory in character, acts on the deflectable plate to cause it to vibrate at a frequency proportional to flow rate. The vibratory frequency is converted by the sensor into a corresponding electrical signal which may be indicated to provide a flow rate reading.

To enhance the signal and to avoid trapped vortices at the junction of the plate and the vortex shedding body, slots or vents may be cut into the plate to allow some shunt flow from one side thereof to the other. These trapped vortices are described in Schlicting text "Boundary Layer Theory," but they may not be a problem if the plate is short relative to the width of the shedder body. The behavior of this meter is essentially the same as the meter shown in FIG. 1.

THIRD EMBODIMENT

The vortex-type meter in this instance may include an obstacle assembly in any of the forms previously described or presently known in the art, and is designed for ready insertion in a flow line, conveying a fluid whose flow rate is to be measured. The flowmeter insert, as best seen in FIG. 8, is constituted by a flow tube 27 having an obstacle assembly 28 mounted therein, the tube being provided with annular mounting flange 29 only at the input end thereof. Supported laterally from the mounting flange by means of a post 30 is a housed signal conditioner 31 which is coupled to the meter sensor and is responsive to the signal produced thereby. The nature of the signal conditioner forms no part of the present invention.

The flowmeter is interposed in a flow line constituted by an upstream pipe 31 whose mounting flange 32 has a circular series of bores therein adapted to accommodate bolts 33, and a similar downstream pipe 34 having a complementary mounting flange 35. The meter is installed by telescoping flow tube 27 into downstream pipe 34, and then clamping the meter flange 29 between the upstream and downstream pipe flanges 32 and 35 by means of bolts 33. The several bolts form a cage encircling and abutting the periphery of the meter flange and acting to center the flow tube within the downstream pipe. Sandwiched between the meter flange and the upstream and downstream pipe flanges are gaskets 36 and 37 to prevent fluid leakage.

It is important for proper meter operation that flow tube 27 be centered within upstream pipe 31. If a flowmeter insert having a mounting flange were specifically designed to be placed in pipes having a known flange rating, then it would be a simple matter to provide the flowmeter with a mounting flange whose outside diameter was properly related to the bolt positions on the pipe flanges as to fit exactly within the cage formed thereby.

But in practice, one may be required to install the flowmeter in pipes having a range of flange dimensions, in which case it becomes difficult to center the flow tube, for the bolts of the cage may in many instances not engage the periphery of the meter flange. To overcome this drawback, removable spacer rings such as ring 38, are provided which are adapted to embrace the mounting flange 29, the ring being split to make room for the lateral post 30. The thickness of the ring is such as to impart to the flange an effective outer diameter matching the diameter of the bolt cage, whereby the flow tube is then centered in the downstream pipe.

Hence by adding a spacer ring whose inner diameter conforms to the outer diameter of the meter flange and whose thickness is appropriate to the size of the pipe mounting flanges of the line in which the meter is to be installed, one then is able to use the same meter with various pipe flange ratings.

It is to be noted that in this arrangement the incoming fluid in the upstream pipe passes into a meter flow tube whose diameter is somewhat smaller than that of the pipe. This relationship of diameters is necessary to permit telescoping, but it also has other advantages. To avoid an abrupt transition in the flow from the larger diameter pipe to the smaller diameter flow tube, the mounting flange 29 is chamfered to provide a tapered inlet. What is gained by a reduced diameter flow tube is that it tends to correct for irregularities in the flow distribution profile resulting from discontinuities in the upstream piping as a result of bends or other flow-disturbing factors in the line. At the same time, meter installation is simplified, for it is not necessary as with conventional vortex meters in which the diameter of the flow tube matches that of the line to provide a flow tube with flanges at either end to be bolted both to the upstream and downstream pipe flanges.

While there have been shown and described preferred embodiments in accordance with the invention, it will be appreciated that many changes and modifications may be made therein without, however, departing from the essential spirit thereof.

I claim:

1. A flowmeter of the vortex type comprising:
   (A) a flow tube through which fluid to be measured is conducted;
   (B) an obstacle assembly disposed within said tube and constituted by a front section fixedly mounted across the tube and contoured to cause flow separation and downstream vortices having a periodicity which is a function of flow rate, and a rear non-streamlined section behind said front section and extending across said tube to define a gap with respect to said front section, said rear section having a tail extending across said tube and projecting from said rear section, said rear section being in strip form and defining with said tail a T-shaped body in which the strip is the base and extends across said tube and the tail is the leg and extends in the longitudinal direction in said tube, the length of said leg being about equal to the width of said base, the dimensions of said tail relative to said rear section being such as to produce surges in a path going around the tail to positively reinforce said vortices, and
   (C) means to sense said vortices to produce a signal whose frequency is proportional to flow rate.

2. A flowmeter as set forth in claim 1, wherein said rear section is cantilevered from said front section and is slightly deflectable whereby it is excited into minute vibration by said vortices, and said sensor is a piezoelectric deflection detector.

* * * * *